United States Patent [19]
Kiwalle et al.

[11] 3,817,439
[45] June 18, 1974

[54] APPARATUS FOR FLASH REMOVAL FROM HEAT AND PRESSURE WELDED ARTICLES

[75] Inventors: Jozef Kiwalle, Peoria; Paul H. Merrit, East Peoria; Edward J. Sluetz, Peoria, all of Ill.

[73] Assignee: Production Technology Inc., Peoria, Ill.

[22] Filed: Jan. 15, 1973

[21] Appl. No.: 323,342

Related U.S. Application Data

[62] Division of Ser. No. 110,558, Jan. 28, 1971, Pat. No. 3,725,997.

[52] U.S. Cl.......................... 228/2, 29/470.3, 83/914
[51] Int. Cl............................................. B23k 27/00
[58] Field of Search......... 228/2; 29/470.3, 156.7 R; 83/914; 156/73

[56] References Cited
UNITED STATES PATENTS

| | | | |
|---|---|---|---|
| 3,438,561 | 4/1969 | Calton | 228/2 |
| 3,662,941 | 5/1972 | Gage | 29/470.3 X |
| 3,691,622 | 9/1972 | Takagi et al. | 228/2 X |

*Primary Examiner*—J. Spencer Overholser
*Assistant Examiner*—Robert J. Craig
*Attorney, Agent, or Firm*—Phillips, Moore, Weissenberger, Lempio & Strabala

[57] ABSTRACT

Flash is removed from a friction welded article while the flash still has residual heat from the welding operation. The welded article is rapidly transferred from the weld zone to a flash removal tool after the weld is made. The flash removal tool is automatically actuated as the article is transferred to the tool.

7 Claims, 5 Drawing Figures

APPARATUS FOR FLASH REMOVAL FROM HEAT AND PRESSURE WELDED ARTICLES

This is a division, of Ser. No. 110,558, Filed Jan. 28, 1971 now U. S. Pat. No. 3,725,997.

BACKGROUND OF THE INVENTION

It is a well known practice in the industry today to produce articles by joining at least two workpieces by heat and pressure welding. Production of articles in this manner is accomplished by heating the members to be welded at a common interface to a plastic state and applying an axial load to displace plastic material radially from the interface in the form of radially extending flash and to create a bond between these materials. Several forms of heat and pressure welding processes are presently known and these include flash butt welding, friction welding, and inertia welding.

Although these weld processes have the capability of producing economical, sound welds of high structural integrity, some problems do arise in applications where it is necessary to remove the radially extruded flash. In many high strength materials, if the flash is allowed to cool subsequent to the weld operation, it is generally necessary to reheat or temper the flash in some manner to bring it to a weakened state which will permit either shearing or cutting of the flash from the welded article.

Although it is possible to shear the flash when it is in a cold state, this is also undesirable. It has been found that shearing of flash when it is at room temperature results in undercutting — that is, it shears below or radially inwardly of the outer surface of the welded article. This undercutting in many cases is of a depth greater than the material removed in a finish machining or grind operation. If the groove or undercut is not completely removed during the finish operation, expensive scrap results or in instances where the groove is not otherwise undesirable, strength of the article is adversely affected.

One of the presently known methods for removing flash from heat and pressure welded articles is to provide a flash shearing device in association with one of the workpiece holding means in the welder. The shear is then actuated upon completion of the weld cycle to shear or cut the flash from the welded article while still in a hot, weakened state. The time required for removal of the flash from the welded article is necessarily added to the total machine cycle time since the article cannot be discharged and the machine reloaded for the next welding cycle until the flash removal operation is completed. In many high production applications, it is not economically desirable or tolerable to burden a welding machine with the flash removal time, and the cost of providing appropriate heating equipment to reheat the flash for removal at some later time is also prohibitive.

SUMMARY AND OBJECTS OF THE INVENTION

This invention relates to a method and apparatus for removing radially extruded flash from heat and pressure welded articles. More specifically, this invention is directed to transfer of the welded article from the welding machine to a flash removal station immediately after the weld is accomplished for removal of the flash from the welded article while the flash is still in a weakened state as a result of residual heat from the weld process.

The present invention removes the flash without hindering or delaying the reloading of the machine for the next weld cycle. The parts are joined in a welding machine. After the weld is made the article is discharged from the welder and is automatically conducted to a flash removal mechanism associated with the welder. When the welded article is properly positioned in the flash removal unit, sensing means initiate the flash removal cycle. This engages appropriate tooling with the flash for removal from the welded article while residual heat from the welding operation remains in the flash.

It is, therefore, an object of this invention to remove radially extruded flash from heat and pressure welded articles.

It is a further object of the invention to remove the flash automatically and before the flash cools and hardens without delaying initiation of the next weld cycle of the welding machine.

It is a still further object of the invention to construct a flash removal mechanism separate from the welding zone of the welding machine, with means to rapidly transfer the welded article to the flash removal mechanism after it is discharged from the welding machine so that the flash can be removed while it is still in a heated state due to residual heat from the welding operation.

It is a still further object to sense the presence of a welded article in the flash removal position and to automatically initiate operation of the flash removal mechanism.

BRIEF DESCRIPTION OF THE DRAWINGS

Other objects of this invention will become apparent from the following description and accompanying drawings wherein.

DESCRIPTION OF THE PREFERRED EMBODIMENTS

Several forms of heat and pressure welding processes are presently known, any one of which is suitable for advantageous use in the method and apparatus described hereinafter. For the purpose of illustrating one specific form of our invention, we have chosen to disclose a friction welder of the general type now manufactured and sold by our assignee.

Figure 1:
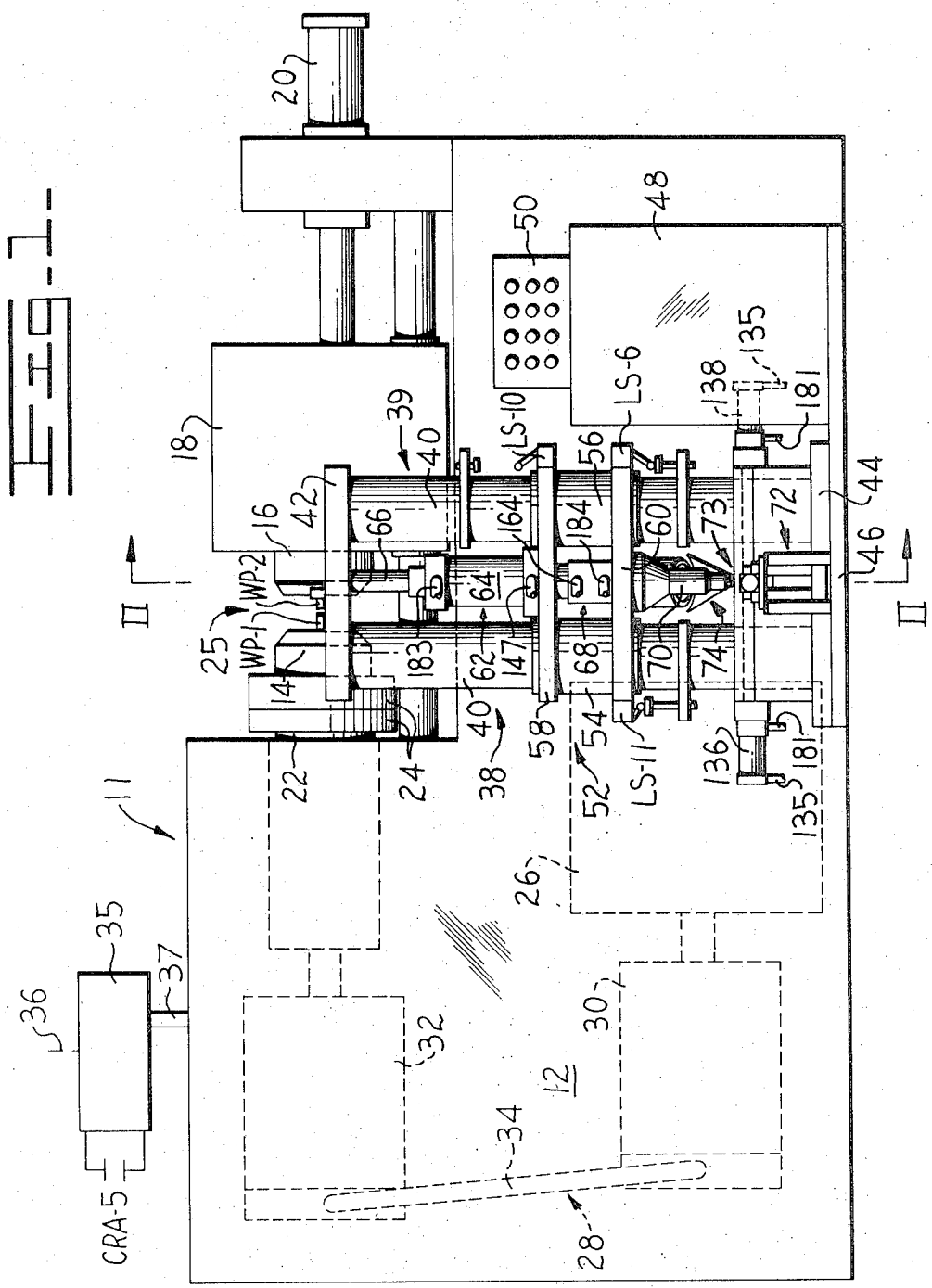
FIG. 1 is a front elevational view of a friction welder and also includes an elevational view of one exemplary embodiment of a flash removal mechanism associated therewith.

A friction welding machine constructed in accordance with one exemplary embodiment of the present invention is indicated generally by the reference numeral 11 in FIG. 1. As shown, the machine 11 comprises a frame or housing structure generally denoted at 12 for housing the various elements of the machine. The two parts to be welded, workpieces WP-1 and Wp-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder and thus determines the force with which the parts WP-1 and WP-2 are engaged.

The chuck 14 is mounted on a spindle 22 and the chuck and spindle are mounted for rotation within the frame 12. The rotary spindle 22 is adapted to receive flywheels 24, which may be of various size and mass depending upon the particular application of the machine. Means in the welding machine including chucks 14 and 16 and the area therebetween where the weld is accomplished define a weld zone of the welding machine and are indicated generally at 25.

An electric motor 26 rotates the spindle through a hydrostatic transmission indicated generally by the reference numeral 28. The hydrostatic transmission includes a hydrostatic pump 30, a hydrostatic motor 32, and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam in the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine, as described in U.S. Pat. No. 3,273,233, and as described in further detail below.

An electrical machine control circuit is schematically illustrated at 35 and is connected to any suitable power source by a line 36 and to welder 11 by a control cable 37. The control circuit 35 also includes a normally open relay contact CRA-5 for purposes as hereinafter described.

A welding operation to join a first workpiece to a second workpiece can be performed by operating the machine in the following general manner. One of the weld pieces WP-1 is firmly clamped in rotatable chuck 14 located on the spindle 22. The other weld piece WP-2 is firmly clamped in the non-rotatable chuck 16 which is located on the tailstock portion 18 of the machine. In this manner, the two workpieces are supported for relative rotation and application of axial load or pressure in the weld zone 25. Upon actuation of the motor 26, the flywheel and workpiece WP-1 are accelerated to a predetermined velocity.

Once the predetermined velocity has been obtained, the motor 26 is disconnected or shut down and the ram mechanism is actuated to move the tailstock portion 18 and the workpiece WP-2 into contact with the rapidly rotating workpiece WP-1. As the two workpieces, in this instance the stem and enlarged head portions of an engine valve, are brought into contact under the upsetting pressure applied through the ram 20, heat is generated at the contacting surface or interface of the weld pieces. This heating increases until the workpieces reach the weld temperature, at which time the material in the two workpieces immediately adjacent the contacting interface is in a plastic state. At this time, the upsetting pressure applied by the ram 20 at either a constant or varying pressure causes radial flashing or upsetting of the heated plastic material to occur and form a ring of radially extending flash. During this heating and flashing, the rotational velocity of the spindle member 22 has continued to decrease. At the time the rotation of the spindle ceases, upsetting has taken place and the weld is completed.

In many applications, it is desirable, or in fact necessary, to remove the radially extending flash from the welded article.

The present invention produces a semi-finished welded article without requiring additional machine operations and/or expensive heating or tempering equipment. The present invention removes the flash while residual heat remains from the weld operation.

For this purpose and as may also be seen from FIG. 1, a flash removal mechanism indicated generally at 38 is located adjacent to the welding machine 11. Although the flash removal mechanism 38 is shown as being separate from and located in front of the welding machine 11, it should also be understood that the flash removal mechanism could be located in any other advantageous position as long as it is reasonably close to or disposed within the welding machine.

The flash removal mechanism 38 comprises a frame indicated generally at 39. The frame 39 has spaced upstanding post members 40 joined at their opposite ends by upper and lower end members 42 and 44 respectively. The flash removal mechanism 38 is mounted on a base plate 46, which also supports a control cabinet 48 having an operator's control panel 50 mounted on the upper end.

A movable head generally indicated at 52 and comprising a pair of tubular bearing members 54 and 56 rigidly interconnected by spacer plates 58 and 60 is movably mounted on post members 40 of frame 39 of the flash removable mechanism. An extensible fluid actuator 62 consisting of a cylinder 64 and a rod and piston assembly 66 is rigidly connected between the upper end plate 42 and the spacer plate 58 of the head 52 and is adapted upon actuation to move the head 52 with respect to frame 39. A fluid actuator 68 is rigidly carried in the head 52 intermediate the plates 58 and 60 in generally coaxial arrangement with a guide and press extension 70 rigidly secured to the spacer plate 60 for purposes to be hereinafter described.

A flash shearing fixture which includes tooling for removal of the flash from the welded article is generally indicated at 72. Fixture 72 is mounted on the lower end plate 44 in substantial alignment with a means, guide and press extension 70, for moving the welded article relative to the flash removal tooling. Means associated with the welder, including the fixture 72 and a press extension 70, define a flash removal zone as generally indicated at 73. As previously stated, the flash removal mechanism 38 is located adjacent the welder 11, and in this case is disposed immediately in front of the welding machine in general alignment with the chucks 14 and 16.

A conducting mechanism 74 is associated with the welding machine 11 for transfer of the welded article to the flash removal zone upon discharge of the article from the weld zone. An exemplary means for conducting or transferring welded articles from the weld zone to the flash removal zone comprise an inclined, closed tubular chute means 75 terminating at its upper end in an enlarged or flared upper trough portion 76. The trough is supported on the welder 11 in an area immediately below the non-rotatable chuck 16 or the welding zone 25. The chute 75 extends downwardly and outwardly therefrom through the front wall of the welding machine 11 and terminates at its other end by connection to an open generally U-shaped guide portion 77 which extends downwardly therefrom at a rather steep angel to where it is secured to the flash removal mechanism 38 by a bracket 78 in the flash removal zone 73. The bracket 78 is connected to a fixed horizontally disposed guide plate 80 having surfaces therein which define a tapered bore 82, one edge of which is substantially aligned with the lower open end of the guide 77.

Figure 2:
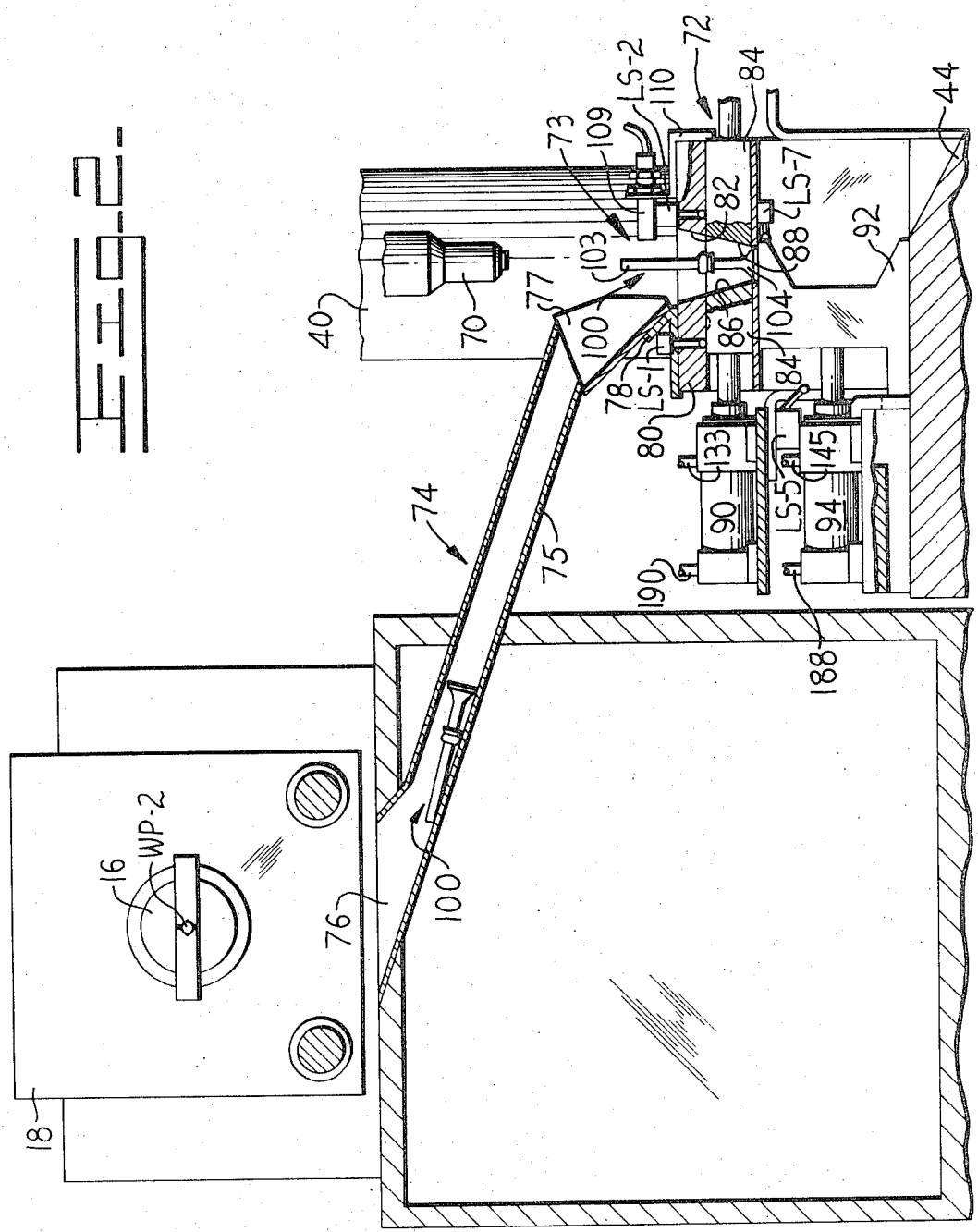
FIG. 2 is a cross sectional view of the friction welder and flash removal mechanism of FIG. 1 taken along the plane and in the direction indicated by lines II—II shown on FIG. 1.

A pair of cooperating locater dies 84 are slidably mounted in fixture 72 immediately below the plate 80. The inner ends of the locater dies 84 terminate in surfaces which define semi-cylindrical tapered recesses 86 and 88. When the locater dies are in an end-to-end relation as shown in FIG. 2, the tapered semicircular recesses form a continuation of the tapered bore 82 in the plate 80. Extensible fluid actuators, one of which is shown at 90, are supported on the fixture 72, each having a movable rod extending from one end for connection to a respective one of the locater dies 84 for moving them inwardly and outwardly in the fixture 72, as will be hereinafter explained.

A support member 92 is slidably mounted in the fixture 72 immediately below the locater dies 84 and is adapted for movement between a position for closing the lower open end of the semicircular recesses 86 and 88 and a position clearing the open end of the recesses, for purposes as will be hereinafter described. An extensible fluid actuator 94 is secured to the lower end member 44 and has a movable rod extending from one end which is connected to the support member 92 for movement of the support member between the above-described positions.

Figure 3:
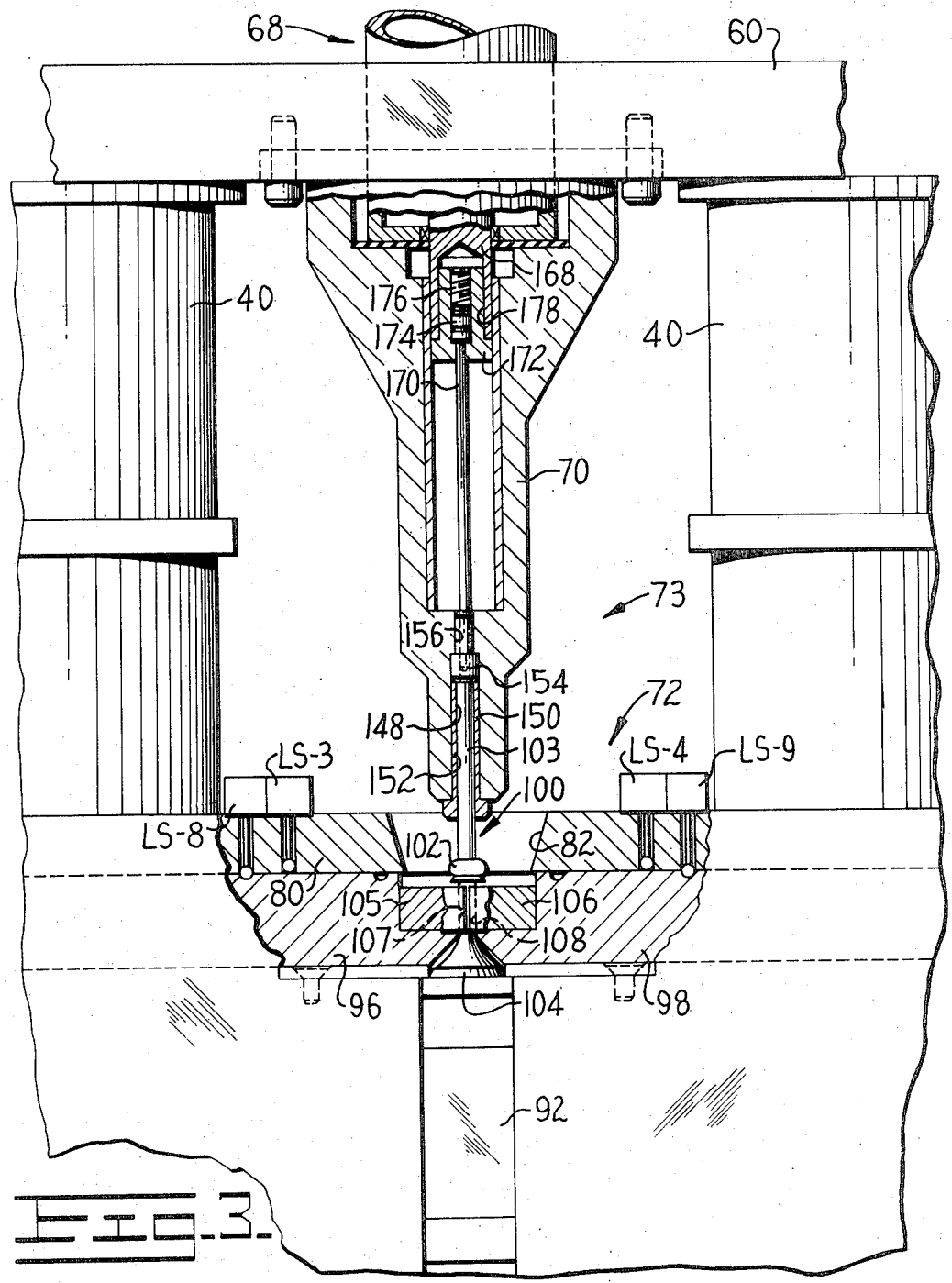
FIG. 3 is a fragmentary view in partial cross section of the flash removal unit, with a welded article in place and the components of the flash removal unit in a position for commencing removal of flash from the article.

A pair of longitudinally opposed slide members 96 and 98, as is best shown in FIG. 3, are supported in the fixture 72 immediately below the plate 80 for longitudinal movement in the same horizontal plane as, and 90° removed from the locater dies 84. The slides 96 and 98 support tooling for removal of a radially extending ring of flash 102 from a welded article or valve 100 shown in FIGS. 2 and 3, in the position occupied just prior to the flash removal operation. As may be seen in FIGS. 2 and 3, the valve consists of an elongated, cylindrical stem portion 103 and a mushroom shaped enlarged head portion 104.

In the specific embodiment illustrated, the flash removal tooling consists of a pair of shear die members 105 and 106 fixedly secured to the inner adjacent ends of slide members 96 and 98 respectively. Each of the shear dies 105 and 106 are provided at their inner adjacent edges with semicircular recesses 107 and 108, respectively. The recesses 107 and 108 substantially conform to the size and shape of the welded article and cooperate due to juxtaposition of the shear dies 105 and 106 to substantially encircle the valve 100 in a position immediately to one side of the flash 102 prior to the removal operation.

A proximity switch 109 is fixedly secured to the plate 80 by a bracket 110 in a position to be responsive to the introduction of the valve 100 into the fixture 72, for purposes as will be hereinafter explained.

In operation, as a weld is completed by the welding machine 11, the valve 100 is discharged from the welding zone 25 into the open end 76 of a chute 75. Due to the inclined position of the chute 75, the welded article, under the influence of gravity, slides downward — enlarged head end 104 first — and is discharged into the guide 77 for direction into a tapered hole 82 of the plate 80, and the continuation thereof formed by the recesses 86 and 88 of the locater dies 84 so as to position the valve in the flash removal zone 73. At this point in the operation, the locater dies will be in the position shown in FIG. 2 to properly position the valve on the support 92 which will also be in the position shown.

Figure 4:
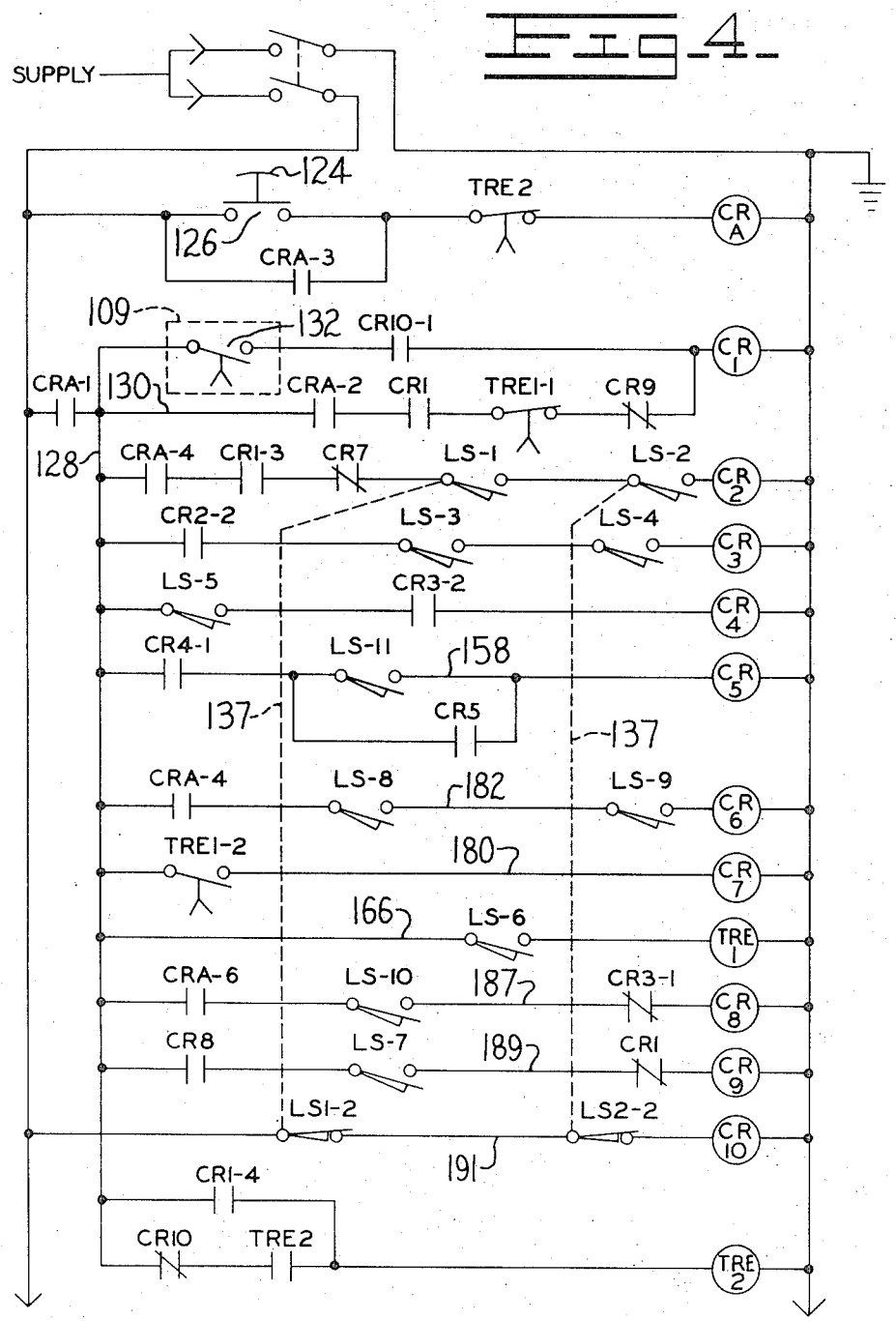
FIG. 4 is a schematic illustration of the electrical circuitry associated with the flash removal unit for automatic operation thereof.

As the valve enters the flash shearing position, its presence is sensed by a proximity switch 109 which then functions to energize a relay coil CR1 in the electrical control circuit for the flash removal mechanism, as is illustrated in FIG. 4.

With the fixturing components properly positioned as shown and prior to the introduction of a welded article to the flash removal zone, depression of an automatic start button 124 closes a switch 126 which energizes a relay coil CRA to close normally open contact CRA-1 to energize an automatic cycle power line 128 and closes a normally opened contact CRA-2 in a line 130 connecting between automatic cycle line 128 and a relay coil CR1. A latching contact CRA-3 is also closed to seal in relay coil CRA, and a normally open contact CRA-4 on line to a relay coil CR2 is also closed. Energizing of coil CRA also closes normally open contact CRA-5 (FIG. 1) in the machine control circuit 35 to condition that circuit for operation of the welder 11.

Figure 5:
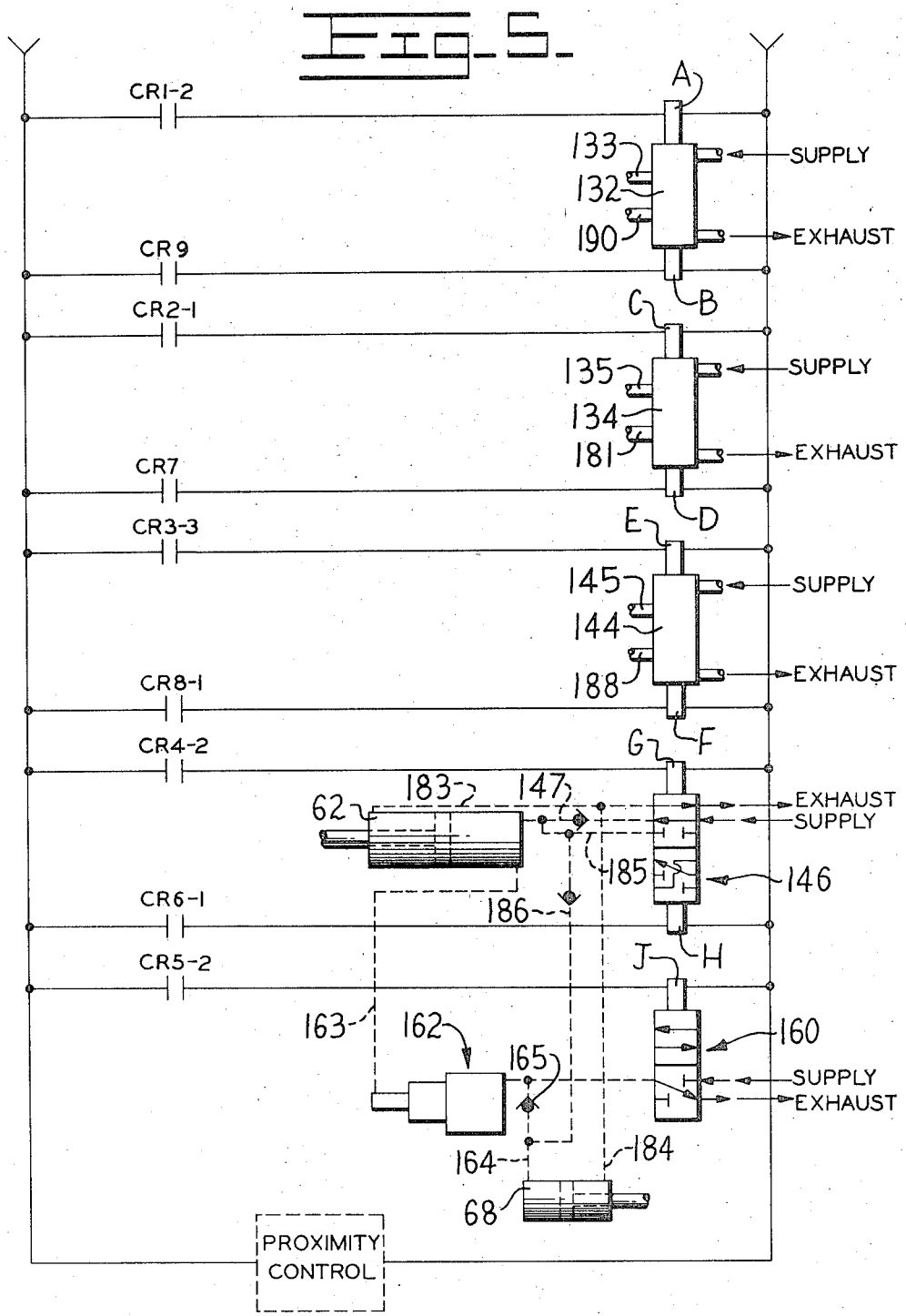
FIG. 5 is a schematic illustration of an electrical solenoid and fluid pressure circuit associated with and controlled by the circuit of FIG. 4 for actuating of the flash removal unit components.

With the circuit so conditioned, the proximity sensing unit 109, in response to the presence of a welded article, closes switch 132 on line to a relay coil CR1, and since a normally open contact CR10 is closed, as will be hereinafter described, the coil CR1 is energized. Energizing of the coil CR1 closes a latching contact CR1-1 disposed in series with the contact CRA-2 in the line 130 to seal in the relay coil CR1. Energizing of the relay coil CR1 also closes the contact CR1-2 in a solenoid circuit as illustrated in FIG. 5, as well as a normally open contact CR1-3 on line to a relay coil CR2. This also closes a normally open contact CR1-4 to energize a timer TRE-2 for purposes hereinafter described.

Closing of the contact CR1-2 energizes the solenoid A to condition a valve 132 for direction of fluid pressure through a conduit 133 to the rod end of the actuators 90 (FIG. 2) to retract the locater dies 84. As the locater dies retract, limit switches LS-1 and LS-2 are activated to a closed position, and as may be seen in FIG. 4, this completes a circuit to energize the relay coil CR2, which in turn closes a normally open contact CR2-1 (FIG. 5) to energize a solenoid C operatively associated with a valve 134. Retraction of the locater dies 84 also actuates, through mechanical connections 137, a pair of normally closed limit switches LS1-2 and LS2-2 to an open position to de-energize a relay coil CR10 and thus open contacts CR10-1, as previously mentioned.

Energizing of the solenoid C conditions a valve 134 to direct pressure through a conduit 135 to a pair of extensible actuators 136 and 138 (FIG. 1) operatively associated with the slides 96 and 98 to move them to the position shown in FIG. 3. With the slides 96 and 98 in that position, the flash removal dies 105 and 106 are in a position where the recesses 107 and 108 engage with and substantially encircle the valve 100 at a position immediately below the radially extending flash 102. Energizing of the coil CR2 also closes a normally open contact CR2-2 on line to a relay coil CR3.

Actuation of the slides 96 and 98 to the flash removal position trips a pair of limit switches LS-3 and LS-4 to complete a circuit 142 and energize the relay coil CR3. This is effective to open the normally closed contact CR3-1 associated with the relay coil CR8. This also closes a normally open contact CR3-2 on line to a relay coil CR4. Energizing of the coil CR3 also closes a normally open contact CR3-3 (FIG. 5) to energize a solenoid E. This conditions a valve 144 to direct pressure through a conduit 145 to the rod end of the actuator 94 to retract the support member 92.

As the support member 92 is retracted, as previously described, a limit switch LS-5 is activated to closed condition and since contact CR3-2 is already closed at this point, a relay coil CR4 is energized. This function closes a normally open contact CR4-1 on line to a relay coil CR5 and also closes a contact CR4-2 to energize a solenoid G. This conditions a valve 146 to direct pressure through a conduit 147 to the head end of actuator 62 for extension to move the head 52 downward on frame 38. As the head 38 moves downward, a bore 148 defined by a bushing 150, which is press fitted into a bore 152 defined in the lower end of the press extension 70, telescopically engages the upper stem end 103 of the valve 100. This downward movement continues until the upper end of the valve 100 comes into contact with the lower end of a plug 154 press fitted into a bore 156 defined in the press extension 70.

As head 52 and press extension 70 reach the last described position, a limit switch LS-11 is actuated to a closed condition to complete a circuit 158 and energize a relay coil CR5. This closes a latching contact CR5-1 and also closes a normally open contact CR5-2 (FIG. 5) to energize a solenoid J. This is effective to condition a valve 160 and to energize a pressure intensifier indicated generally at 162. Energizing of pressure intensifier 162 provides an amplified output which is directed to the actuator 62 through a line 163 to increase the pressure therein and to provide sufficient force for moving the welded valve 100 through the dies 105 and 106. This is effective to bring the flash into contact with the dies and to shear flash 102 from the valve. At this time, supply pressure from the valve 160 is also directed to the actuator 68 through a line 164 and a check valve 165.

The force required to break the flash 102 from the article 100 is kept in a reasonable range due to the weakened state of the flash from residual heat remaining from the weld operation. For example, it has been found that in most instances, for easy shearing and to avoid undercutting, the flash should be sheared before the residual heat in the flash is dissipated below approximately 500° Fahrenheit. Should the flash cool below a predetermined level prior to the flash removal operation, the force generated by the actuator 62 would not be sufficient to shear the flash from the welded article. As a result, the flash removal unit would stop in the position shown in FIG. 3, and the timer TRE-2 would time out, for example, in six seconds or less, before the flash removal unit had completed its cycle, as described above. Timing out of timer TRE-2 breaks the circuit to relay coil CRA to de-energize the automatic cycle mode of operation and to open all CRA contacts in the flash removal control of FIG. 4. In addition, de-energizing of the relay coil CRA allows normally open contact CRA-5 in the machine control to open and to interrupt the welding machine cycle at that point.

This shutdown of the welder signals to the operator that a malfunction has occurred such that the malfunction can be corrected before a substantial number of welds are completed by the weld machine. Any welds which are completed during a malfunction of the flash removal mechanism would cool, and therefore the flash would have to be removed by other means such as reheating and shearing or grinding, particularly in most high strength materials.

Continuing now with a flash removal cycle, as the head 52 moves downward to shear the flash 102 from the valve 100, a limit switch LS-6 (FIG. 4) is closed to complete circuit 166 to energize the timer coil TRE-1 to provide a dwell in the control function. As the flash 102 breaks away from valve 100, the actuator 62 is fully extended and the movement of the head 52 stops. Since supply pressure is available to actuator 68, as previously described, a piston assembly therein — the rod of which is shown at 168 (FIG. 3) — is extended. As may be best seen in FIG. 3, an ejector or stripper means comprising a pin 170 is fixedly secured in an adapter plug 172 by a spacer 174 and a setscrew 176. The adapter plug 172 is press fitted into a bore 178 defined in the lower end of the rod 168.

With this arrangement and as rod 168 is extended, a stripper pin 170 is moved downward into contact with the upper end of the valve 100. Continued downward movement of the pin 170 pushes the valve 100 completely through the flash removal dies 105 and 106 to strip the ring of sheared flash 102 from the valve. The simi-finished article or valve then drops from the bottom of the flash removal mechanism into any suitable receptacle for transport to the next finishing operation.

After the flash is stripped from the welded article, the timer TRE1 times out, which opens normally closed contact TRE1-1 to de-energize the relay coil CR1 and to open all CR1 contacts in the control circuit and the CR1-2 contact in the solenoid circuit to de-energize the solenoid A, which in turn conditions valve 132 to a neutral condition. Opening of the CR1 contacts in the control circuit de-energizes the relay coils CR2, CR3 and CR4, and thereby neutralizes the valves 134, 144 and 146.

Timing out of the timer TRE1 also closes the normally open contact TRE1-2 to complete a circuit 180 and to energize a relay coil CR7 and to energize the solenoid D (FIG. 5) to condition the valve 134 to a die retract position, which directs fluid pressure through a conduit 181 to the rod end of cylinders 136 and 138 and moves the slides 96 and 98 to a retracted position. As the slides 96 and 98 retract, a pair of limit switches LS8 and LS9 are closed to complete a circuit 182 and to energize a relay coil CR6. This is effective to close the normally open contact CR6-1 in the solenoid circuit of FIG. 5 and to energize the solenoid H to condition the valve 146 to direct fluid pressure through a conduit 183 to the rod end of the fluid actuator 62 and to move the head 52 upward on the frame 38. The pressure in the line 183 is also communicated through a line 184 to the rod end of the actuator 68 to return the stripper pin 170 to its uppermost position, as shown in FIG. 3. Fluid expelled from the head ends of the actuators 62 and 68 is communicated to exhaust through the lines 185 and 186 and the valve 146.

As the head 52 reaches a preset upper position, a limit switch LS10 is actuated to complete a circuit 187 and to energize the relay coil CR8. A normally open contact CRA-6 was closed when relay CRA was energized and a normally closed contact CR3-1 closed when relay coil CR3 was de-energized, as previously described. This closes a contact CR8-1 in the solenoid circuit and energizes a solenoid F to condition the valve 144 to direct fluid pressure through a conduit 188 to the head end of the actuator 94 to move the support member 92 to the position shown in FIG. 2. Movement of the support member 92 to the closed position as shown actuates a limit switch LS7, which completes a circuit 189 and energizes a relay coil CR9. This closes a contact CR9-1 in the solenoid circuit to energize a solenoid B and to condition the valve 132 for direction of fluid through a conduit 190 to the head end of the actuators 90 to return the locaters 84 to the condition shown in FIG. 2.

As the locaters 84 return to a preset position as shown in FIG. 2, a pair of limit switches LS1-2 and LS2-2 are closed to complete a circuit 191 and to energize a cycle complete relay coil CR10 to close the normally open contacts CR10-1. Since the welded article is no longer present in the flash removal mechanism, the proximity switch 132 is again open to de-energize the coil CR1; and the flash removal mechanism is reset for the next cycle upon arrival of a welded article in the locater dies 84.

While I have illustrated and described the preferred embodiments of my invention, it is to be understood that these are capable of variation and modification and I, therefore, do not wish to be limited to the precise details set forth, but desire to avail myself of such changes and alternations as fall within the purview of the following claims.

What is claimed is:

1. In a welding machine of the kind in which at least two workpieces are welded together to form a welded article by the application of heat and axial force and a ring of radially extending flash is displaced as the weld is formed, and wherein the welding machine includes weld means defining a weld zone and discharge means for discharge of the welded article from the weld zone when the weld is completed, the improvement comprising;

flash removal means associated with said welding machine defining a flash removal zone remote from said weld zone and including a flash removing mechanism;

a conducting mechanism associated with said welding machine for transfer of the welded article to the flash removal zone upon discharge of the welded article from the weld zone; and actuating means for actuating the flash removing mechanism for removing the flash from the welded article.

2. The combination of claim 1 wherein the conducting mechanism comprises an inclined chute means extending generally downward from the weld zone to the flash removal zone for directing the article into the flash removal zone as said article moves down the chute means under the influence of gravity.

3. The combination of claim 2 wherein said chute means includes a closed tube terminating at an upper end in an enlarged trough portion disposed immediately below said weld zone for directing said articles into said closed tube, said closed tube terminating at a lower end in an open guide means for directing the article into the flash removal zone.

4. The combination of claim 1 wherein the welding machine is a friction welder and the two workpieces are welded together by imparting relative rotation therebetween and by bringing the workpieces into contact under pressure at a common interface to heat the material in each workpiece adjacent the common interface to a plastic state whereby at least a portion of the plastic material is extruded as radially extending flash as the weld forms and relative rotation is stopped.

5. The combination of claim 1 wherein the flash removal means comprise a fixture, a flash removal tool, and moving means for moving said article relative to said tool, said fixture supporting said article for engagement by the flash removal tool and the moving means so that the flash is removed as the article is moved relative to said tool.

6. The combination of claim 5 wherein said tool comprises at least two die members, each die member including a recess substantially conforming to the external shape and size of the welded article, die moving means for moving said dies into juxtaposed relation with said article whereby said recesses cooperate to substantially encircle said article at a point disposed axial to a one side of said flash, and said die moving means comprising a press for forcing the article axially through said dies in a direction to bring said flash into contact with the dies and to shear the flash from the article.

7. The combination of claim 6 further including ejecting means responsive to shearing of the flash from the article for ejecting the article from the flash removal tool.

* * * * *